(12) United States Patent
Chavez Sandoval et al.

(10) Patent No.: US 12,422,297 B2
(45) Date of Patent: Sep. 23, 2025

(54) REINFORCEMENT SUPPORT BRACE FOR A FLOAT ARM

(71) Applicant: PHINIA Jersey Holdings LLC, Wilmington, DE (US)

(72) Inventors: Cesar Cain Chavez Sandoval, Ciudad Juarez (MX); Ricardo Rodrigo Dorado Herrera, Ciudad Juarez (MX)

(73) Assignee: PHINIA JERSEY HOLDINGS LLC, Wilmington, DE (US)

( * ) Notice: Subject to any disclaimer, the term of this patent is extended or adjusted under 35 U.S.C. 154(b) by 322 days.

(21) Appl. No.: 18/101,617

(22) Filed: Jan. 26, 2023

(65) Prior Publication Data
US 2024/0255339 A1   Aug. 1, 2024

(51) Int. Cl.
*G01F 23/32* (2006.01)

(52) U.S. Cl.
CPC .................................. *G01F 23/32* (2013.01)

(58) Field of Classification Search
CPC ........ G01F 23/32; G01F 23/34; G01F 23/345; G01F 23/36; G01F 23/363; G01F 23/366; G01F 23/38
USPC ......... 73/305, 306, 307, 309, 310, 311, 312, 73/313, 314, 315, 316, 317
See application file for complete search history.

(56) References Cited

U.S. PATENT DOCUMENTS

| | | | |
|---|---|---|---|
| 1,658,235 A | | 2/1928 | Frank et al. |
| 3,139,897 A | * | 7/1964 | Morgan .................. F16K 33/00 73/317 |
| 4,807,472 A | | 2/1989 | Brown et al. |
| 5,746,088 A | * | 5/1998 | Sawert .................... H01C 10/32 73/317 |
| 6,041,650 A | * | 3/2000 | Swindler ................. G01F 23/34 73/317 |
| 6,089,086 A | * | 7/2000 | Swindler ................. G01F 23/34 73/317 |

(Continued)

FOREIGN PATENT DOCUMENTS

| | | | | |
|---|---|---|---|---|
| EP | 417907 A | * | 3/1991 | ............. G01F 23/32 |
| EP | 1141665 B1 | | 1/2011 | |

(Continued)

OTHER PUBLICATIONS

International Search Report of the International Searching Authority for application No. PCT/US2024/013036, mailed May 6, 2024 (3 pages).

*Primary Examiner* — John Fitzgerald
(74) *Attorney, Agent, or Firm* — WARNER NORCROSS + JUDD LLP

(57) ABSTRACT

A support brace for a float arm of a fluid level sensor is provided. The support brace includes a base having opposite first and second ends, and a beam having opposite first and second ends. The first end of the beam is connected to the first end of the base, and the beam extends from base wherein an angle is formed between the base and the beam. A channel is formed along a length of the base. At least one side clip is attached to a side of the beam. An end clip is attached to the second end of the beam. The channel, the at least one side clip, and the end clip are engageable with a wire that forms the float arm, and the support brace reinforces the float arm. A float arm assembly and a fuel level sensor including the support brace are also provided.

19 Claims, 8 Drawing Sheets

(56) References Cited

U.S. PATENT DOCUMENTS

| | | | |
|---|---|---|---|
| 6,523,406 B2* | 2/2003 | Housey | G01F 23/38 |
| | | | 73/317 |
| 6,554,528 B2* | 4/2003 | Chelko | E04B 2/7416 |
| | | | 403/364 |
| 6,564,631 B1* | 5/2003 | Lake | G01F 23/363 |
| | | | 340/456 |
| 6,658,934 B1 | 12/2003 | Housey et al. | |
| 6,675,648 B2* | 1/2004 | Housey | G01F 23/34 |
| | | | 73/317 |
| 6,868,724 B2* | 3/2005 | Brzozowski | G01F 23/36 |
| | | | 73/317 |
| 6,976,394 B2* | 12/2005 | Kleinen | G01F 23/38 |
| | | | 73/317 |
| 7,219,546 B2* | 5/2007 | Ross, Jr. | G01F 23/38 |
| | | | 73/317 |
| 7,520,167 B2* | 4/2009 | Miyagawa | G01F 23/38 |
| | | | 73/317 |
| 7,721,602 B2* | 5/2010 | Benner | G01F 23/38 |
| | | | 73/317 |
| 7,726,334 B2* | 6/2010 | Ross, Jr. | F16K 31/26 |
| | | | 73/317 |
| 8,689,718 B2* | 4/2014 | Cichoski | B63B 21/00 |
| | | | 114/230.15 |
| 9,499,048 B2* | 11/2016 | Thirlaway | B60K 15/077 |
| 10,458,836 B2* | 10/2019 | Porras | G01F 23/36 |
| 2003/0127754 A1 | 7/2003 | Ruzicka et al. | |
| 2004/0226367 A1 | 11/2004 | Akagawa | |
| 2006/0207324 A1* | 9/2006 | Ross | G01F 23/38 |
| | | | 73/317 |
| 2006/0266112 A1 | 11/2006 | Crary et al. | |
| 2010/0199759 A1* | 8/2010 | Prasad | G01F 23/363 |
| | | | 73/317 |
| 2011/0000297 A1* | 1/2011 | Ford | G01F 23/36 |
| | | | 73/317 |
| 2012/0111108 A1* | 5/2012 | Hashimoto | G01F 23/363 |
| | | | 73/317 |
| 2012/0260730 A1 | 10/2012 | Ross, Jr. | |
| 2014/0020464 A1* | 1/2014 | Farmanyan | G01F 23/38 |
| | | | 73/313 |
| 2015/0300868 A1* | 10/2015 | Smyers | G01F 23/34 |
| | | | 73/317 |
| 2018/0335333 A1* | 11/2018 | Porras | H01C 10/32 |

FOREIGN PATENT DOCUMENTS

| | | | | |
|---|---|---|---|---|
| EP | 3569991 A1 * | 11/2019 | | G01F 23/36 |
| JP | S53133668 U | 10/1978 | | |

\* cited by examiner

REINFORCEMENT SUPPORT BRACE FOR A FLOAT ARM

FIELD OF THE INVENTION

The disclosure generally relates to reinforcement of float arms and, more specifically, to support braces for float arms of fuel level sensors utilized in automotive fuel modules.

BACKGROUND OF THE INVENTION

Fuel modules for automotive vehicle fuel delivery systems commonly include a fuel level sensor that provides an indication of the amount of fuel in a fuel tank in which the fuel module is disposed. The fuel level sensor specifically measures a height of the fuel stored in the tank, which is converted into a visual display on a dashboard gauge or similar of a tank volume between empty and full. Conventional fuel level sensors include a float arm on the distal end of which is mounted a float. The proximal end of the float arm is fixedly connected to a wiper arm which is pivotal about a resistive device such as a ceramic card. The float stays at the surface of the fuel contained in a fuel tank, and changes in the level of fuel in the tank cause the float arm to move which in turn pivots the wiper arm. Pivoting of the wiper arm relative to the resistive device changes the response signal outputted by the device, and the response signal is converted to a tank level/volume based on a predetermined calibration function.

Conventional float arms, however, are susceptible to deformation, especially along the length of the portion of the float arm on which the float is attached due to the loads exerted on the distal end of the float arm. These loads and resulting deformation may occur during packaging, handling, and/or subsequent manipulation during the assembly of the fuel level sensor and fuel module including the sensor. The loads and deformation may also occur during use of the float arm and corresponding sensor, such as due to the weight of the float on the arm and springback of the arm. Deformation of the float arm can lead to measurement errors due to the difference between the actual position/height of the float versus the measured/perceived height determined from the wiper arm calibration function that converts the wiper arm position relative to the resistive device into a fuel level output. Therefore, a need exists for a float arm that is less prone to deformation.

BRIEF SUMMARY

A reinforcement support brace for a float arm of a fluid level sensor is provided. The support brace includes a base having opposite first and second ends, and a beam having opposite first and second ends. The first end of the beam is connected to the first end of the base, and the beam extends from base wherein an angle is formed between the base and the beam. A channel is formed along a length of the base. At least one side clip is attached to a side of the beam. An end clip is attached to the second end of the beam. The channel, the at least one side clip, and the end clip are engageable with a wire that forms the float arm, and the support brace reinforces the float arm.

In specific embodiments, a diagonal member extends between the base and the beam, the diagonal member being connected to the base between the first and second ends of the base, and the diagonal member being connected to the beam between the first and second ends of the beam.

In particular embodiments, a triangular opening is formed between the base, the beam, and the diagonal member.

In specific embodiments, the angle between the base and the beam is an obtuse angle.

In specific embodiments, the channel has a U-shaped cross-sectional shape.

In specific embodiments, the channel includes a plurality of retainers.

In particular embodiments, the retainers are spaced from each other along a length of the channel.

In specific embodiments, each of the at least one side clip includes a channel having a U-shaped cross-sectional shape.

In particular embodiments, each of the at least one side clip includes a retainer centrally disposed along a length of the channel.

In particular embodiments, the channel of each of the at least one side clip is parallel to the beam.

In specific embodiments, each of the at least one side clip is connected to the beam by a linear projection that spaces each clip from the beam.

In specific embodiments, the end clip includes a channel having a U-shaped cross-sectional shape.

In particular embodiments, the end clip includes a retainer centrally disposed along a length of the channel.

In particular embodiments, each of the base, the beam, and the diagonal member includes a flange and a stem that together have a T-shaped cross-sectional shape.

In specific embodiments, the support brace is of a one-piece, monolithic construction.

A float arm assembly for a float of a fuel level sensor is also provided. The float arm assembly includes a float arm wire having a plurality of portions. Adjacent portions of the float arm wire are bent relative to each other such that a bend is disposed between each adjacent portion. The float arm assembly also includes the support brace as described above. The float arm wire is snapped into the end clip, the side clips, and the channel of the support brace to mount the support brace about certain of the bends in the float arm wire.

In specific embodiments, a float is connected to a distal end of the float arm wire.

In particular embodiments, the float is either fixedly connected to the float arm or rotatably connected to the float arm.

A fuel level sensor for a fuel module is also provided. The fuel level sensor includes a body and a ceramic card mounted on the body. A wiper arm is pivotally connected to the body, and the wiper arm is rotatable relative to the ceramic card. The fuel level sensor further includes a float arm having a proximal end and a distal end. The proximal end is mounted on the wiper arm. A float is connected to the distal end of the float arm. The fuel level sensor also includes the support brace as described above. The support brace is mounted on the float arm via the end clip, the side clips, and the channel.

A fuel module including the fuel level sensor is also provided.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

Figure 1:
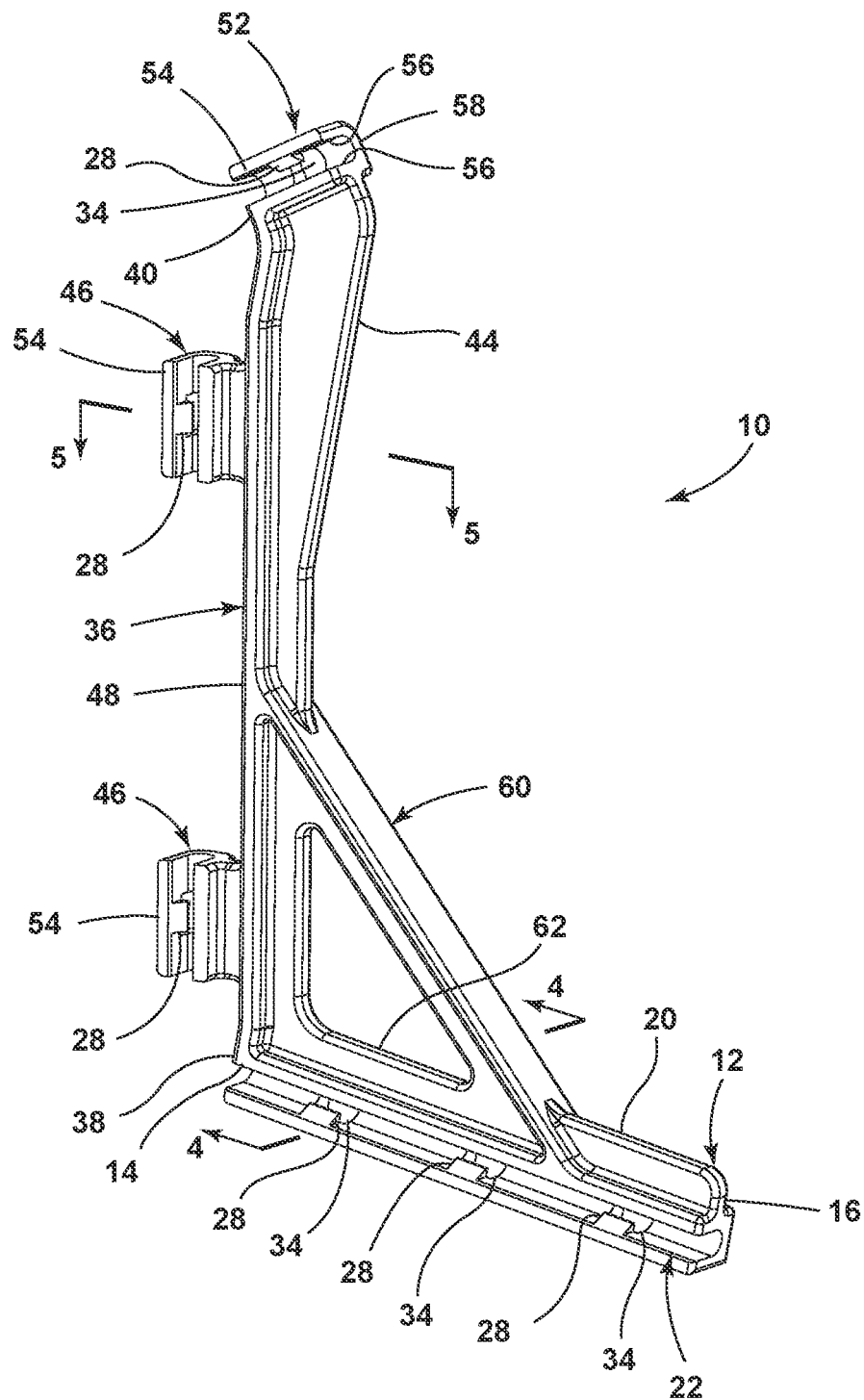
FIG. 1 is a perspective view of a reinforcement support brace for a float arm of a fluid sensor in accordance with some embodiments of the disclosure.

A reinforcement support brace is provided. Referring to FIGS. 1-8, wherein like numerals indicate corresponding parts throughout the several views, the reinforcement support brace (also referred to as the support brace herein) is illustrated and generally designated at 10. Certain features of the support brace 10 as illustrated are functional, but can be implemented in different aesthetic configurations.

With reference first to FIGS. 1-5, in an exemplary embodiment the support brace 10 includes a base 12 having first end 14 and an opposite second end 16. The first end 14 is an inner end, and the second end 16 is an outer, terminal end. The base 12 is generally formed of a T-member that includes a flange 18 and a stem 20 extending outwardly from a center of the flange. The base 12 therefore has a T-shaped cross-section. A channel 22 is formed and disposed along a length of the base 12 that generally extends from the first end 14 to the second end 16. As shown, the channel 22 extends along the entire length of the base 12, but alternatively the channel may extend along only a portion of the length of the base. The channel 22 is generally parallel to the base 12. The channel 22 includes and is defined by a pair of sidewalls 24 that may be parallel to each other and an arcuate bottom 26 between the two sidewalls. The channel 22 thereby has a generally U-shaped cross-sectional shape. The channel 22 is open towards a side of the base 12 with the opening being opposite the arcuate bottom 26 and facing towards a direction that is transverse to the length of the base. At least one, preferably a plurality of retainers 28 are formed in the channel 22. In the case that the channel 22 includes more than one retainer 28, the retainers are spaced, preferably evenly spaced, from each other along the length of the channel which generally corresponds to the length of the base 12. Each retainer 28 is a tab or similar projection that extends from a sidewall 24 of the channel 22 inwardly into the channel. For example, each retainer 28 may be a ramp having an inclined surface 30 (inclined relative to the sidewall) that begins at an outer edge of the channel 22 and slopes upward away from the sidewall in a direction towards the bottom 26 of the channel. A stop 32 is formed at the back side of the inclined surface 30 at the end of the inclined surface opposite the outer edge of the channel 22. Through-holes 34 are formed in the channel 22 that correspond to and are generally aligned with each of the retainers 28.

A beam 36 is connected to the first end 14 of the base 12 and extends away from the base. The beam 36 has a first end 38, which is connected to the first end 14 of the base 12, and an opposite second end 40. The first end 38 is an inner end, and the second end 40 is an outer, terminal end. As shown by example, the beam 36 is longer in length from its first end 38 to its second end 40 than the base 12. An angle α is formed between the base 12 and the beam 36 with the vertex V being at the connection between the first ends 14, 38 of the base and beam. As shown by example, the angle is an obtuse angle in the range of approximately 91 to 110 degrees, but may be greater than 110 degrees. However, it should be understood that the angle may be a right angle or may be an acute angle that is in the range of approximately 89 to 70 degrees, but instead may be less than 70 degrees. The reason for the angle between the base 12 and beam 36 is discussed in more detail below. The beam 36 is generally formed of a T-member that includes a flange 42 and a stem 44 extending outwardly from a center of the flange. The beam 36 therefore has a T-shaped cross-section similar to the base 12. The stem 44 of the beam 36, however, increases in width from a location intermediate and generally centrally disposed between the two ends 38, 40 of the beam 36 towards the outer second end 40 of the beam. The increased width of the stem 44 provides greater strength and rigidity to the beam at its second end 40. At least one, preferably a plurality of side clips 46 are attached to an outer side 48 of the beam 36. Particularly, each of the side clips 46 is attached to the beam 36 by a linear projection 50 that spaces each side clip from the beam. A similar end clip 52 is attached to the second end 40 of the beam 36. The clips 46, 52 generally have the same structure. Each clip 46, 52 includes a channel 54. The channels 54 of the side clips 46 are generally parallel to the beam 36, while the channel 54 of the end clip 52 is generally parallel to the second end 40 of the beam. Each channel 54 includes and is defined by a pair of sidewalls 56 that may be parallel to each other and an arcuate bottom 58 between the two sidewalls. The channel 54 thereby has a generally U-shaped cross-sectional shape. The channel 54 is open towards a side of the beam 36 with the opening facing towards a direction that is transverse to the length of the beam (the length being from the first end 38 to the second end 40). The channel 54 opening faces the same direction as the channel 22 adjacent the base 12. A retainer 28 is formed in the channel 54. The retainer 28 is a tab or similar projection that extends from a sidewall 56 of the channel 54 inwardly into the channel. For example, the retainer 28 may be a ramp having an inclined surface 30 (inclined relative to the sidewall) that begins at an outer edge of the channel 54 and slopes upward away from the sidewall in a direction towards the bottom 58 of the channel. A stop 32 is formed at the back side of the ramp at the end of the inclined surface 30 opposite the outer edge of the channel 54. A through-hole 34 is formed in the channel 54 and is generally aligned with the retainer 28.

Figure 2:
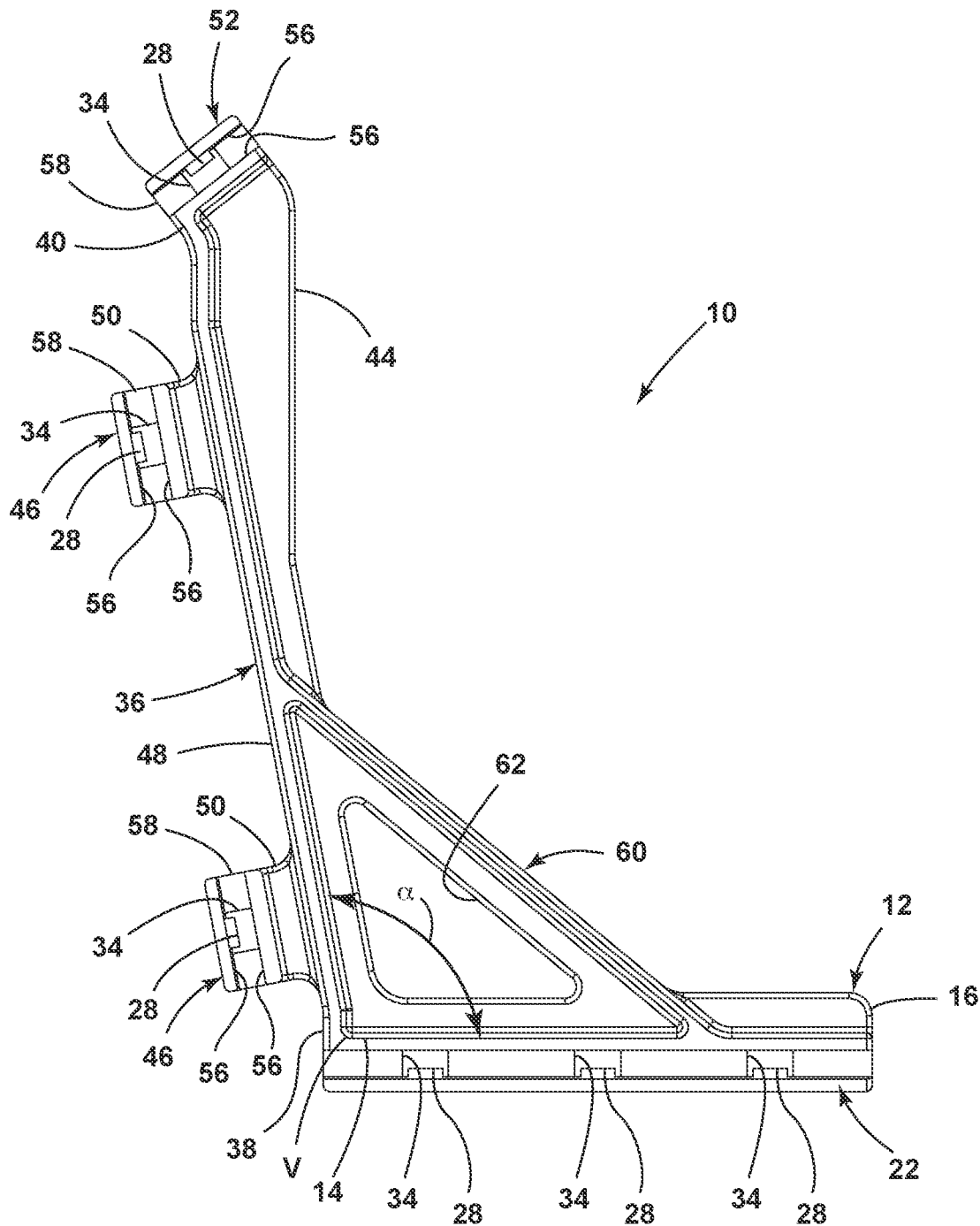
FIG. 2 is a lateral view of the reinforcement support brace of FIG. 1.
Figure 3:
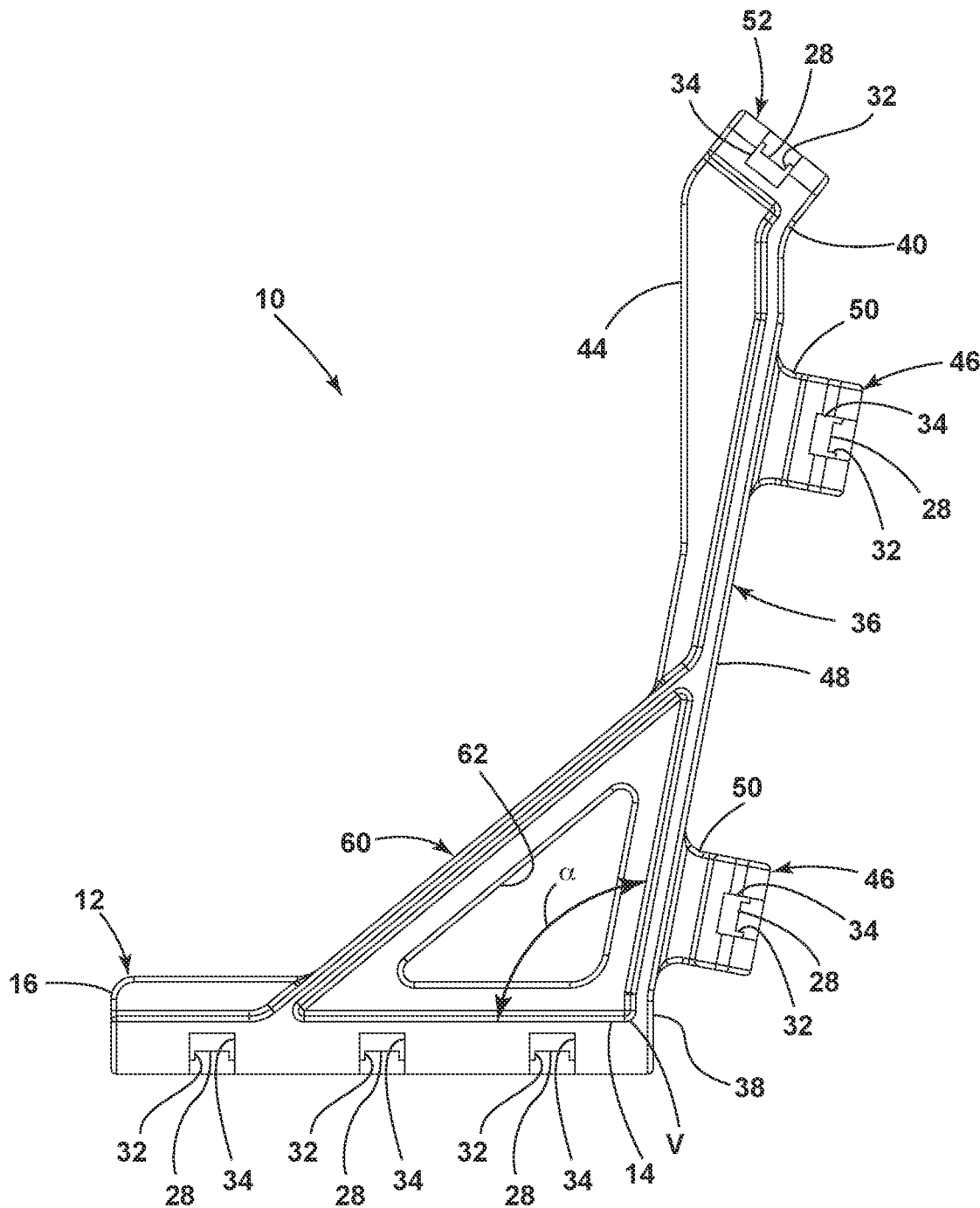
FIG. 3 is an opposite lateral view of the reinforcement support brace of FIG. 1.
Figure 4:
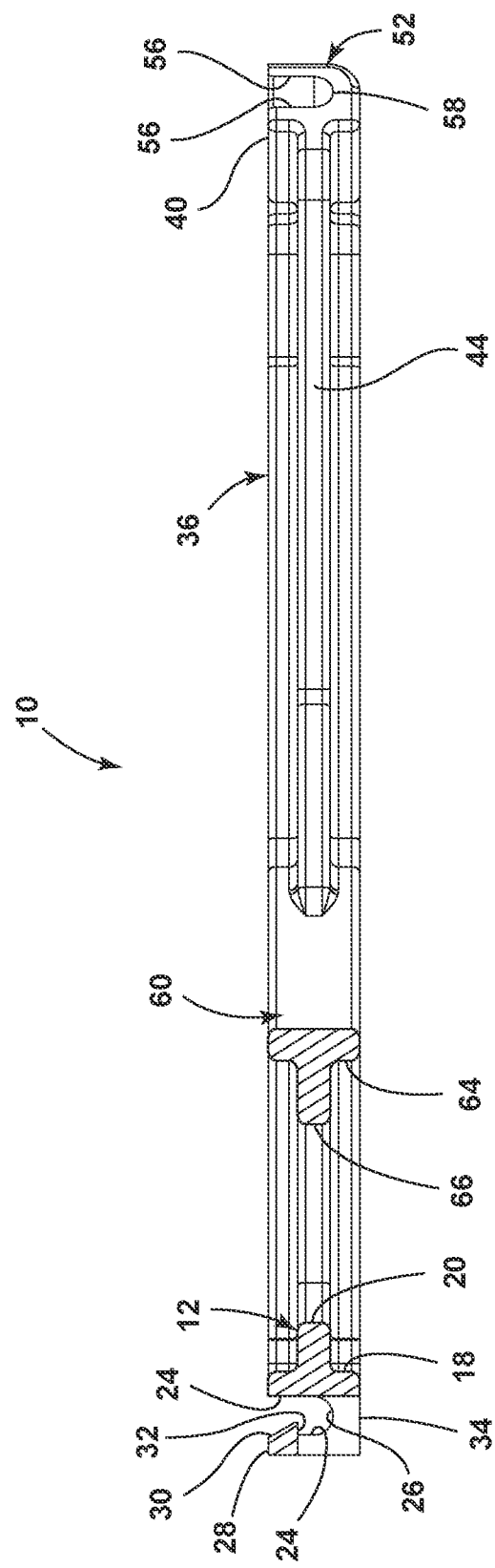
FIG. 4 is a cross-sectional view of the reinforcement support brace taken along the line 4-4 in FIG. 1.
Figure 5:
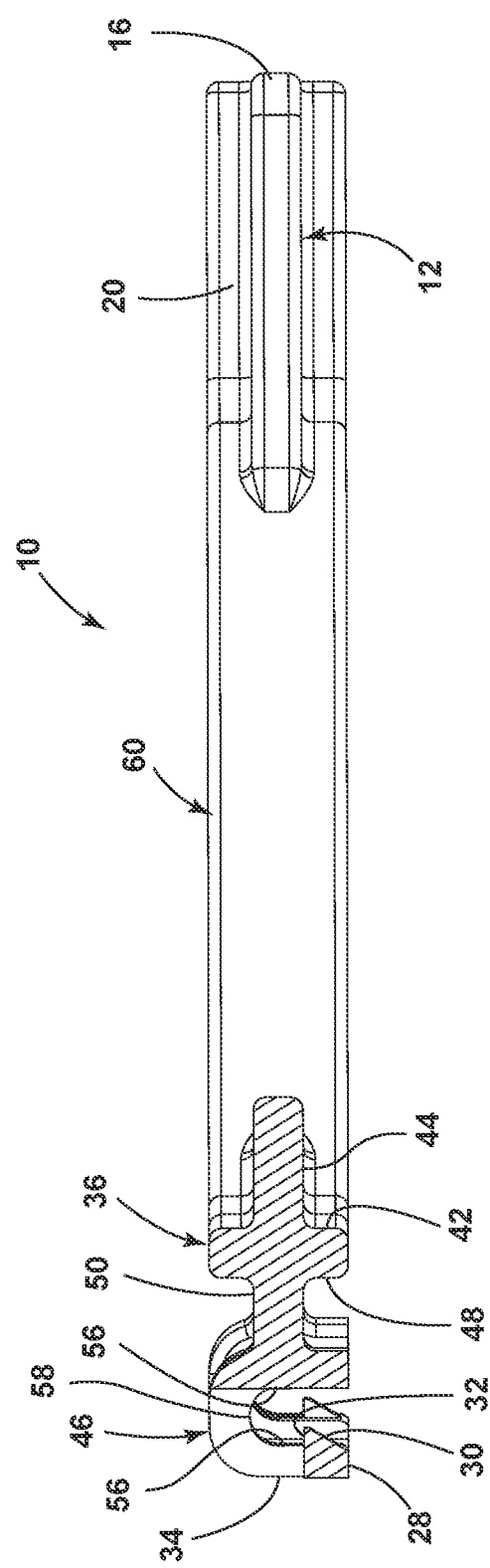
FIG. 5 is a cross-sectional view of the reinforcement support brace taken along the line 5-5 in FIG. 1.

The second end 40 of the beam 36 is angled relative to the rest of the length of the beam such that the end clip 52 is tilted relative to the neighboring side clip 46. For example, the second end 40 of the beam 36 may form an obtuse angle with the rest of the length of the beam as shown in FIGS. 2 and 3.

A diagonal member 60 extends at an angle between the base 12 and the beam 36. The diagonal member 60 is connected to the base 12 between the first and second ends 14, 16 of the base, and is connected to the beam 36 between the first and second ends 38, 40 of the beam. A triangular opening 62 is thereby formed between the base 12, the beam 36, and the diagonal member 60. The diagonal member 60 provides strength and rigidity to the connection between the base 12 and beam 36. The diagonal member 60 is generally formed of a T-member that includes a flange 64 and a stem 66 extending outwardly from a center of the flange. The diagonal member 60 therefore has a T-shaped cross-section.

The support brace 10 may be formed of a one-piece, monolithic construction. In general, materials suitable for use in making the support brace 10 include metals (e.g. steels, aluminums, alloys, etc.), resins (e.g. thermoset and/or thermoplastic resins), rubbers/elastomers, and combinations thereof. In some embodiments, the support brace 10 may be formed of an acetal copolymer for gasoline applications, and in other embodiments, the support brace 10 may be formed of a hot acetal copolymer for diesel applications, and in yet other embodiments the support brace 10 may be formed of any plastic that is compatible gasoline, diesel, or other fuels (e.g. ethanol). However, myriad materials may be used to manufacture the support brace 10, each typically selected as a function of availability, cost, performance/end use applications, etc. Moreover, metals, metal alloys, rubbers/elastomers, and resins are not exhaustive of suitable materials that may be used.

In certain embodiments, the support brace 10 comprises a resin, such as a thermoplastic and/or thermoset resin. Examples of suitable resins typically comprise the reaction product of a monomer and a curing agent, although resins formed of self-polymerizing monomers (i.e., those acting as both a monomer and a curing agent) may also be utilized. It is to be appreciated that such resins are conventionally named/identified according to a particular functional group present in the reaction product. For example, the term "polyurethane resin" represents a polymeric compound comprising a reaction product of an isocyanate (i.e., a monomer) and a polyol (i.e., a chain extender/curing agent). The reaction of the isocyanate and the polyol create urethane functional groups, which were not present in either of the unreacted monomer or curing agent. However, it is also to be appreciated that, in certain instances, resins are named according to a particular functional group present in the monomer (i.e., a cure site). For example, the term "epoxy resin" represents a polymeric compound comprising a cross-linked reaction product of a monomer having one or more epoxide groups (i.e., an epoxide) and a curing agent. However, once cured, the epoxy resin is no longer an epoxy, or no longer includes epoxide groups, but for any unreacted or residual epoxide groups (i.e., cure sites), which may remain after curing, as understood in the art. In other instances, however, resins may be named according to a functional group present in both the monomer and the reaction product (i.e., an unreacted functional group).

With respect to the composition of the support brace 10 described above comprising a resin, examples of suitable resins include thermoset resins and thermoplastic resins. Examples of suitable thermoset and/or thermoplastic resins typically include polyamides (PA), such as Nylons; polyesters such as polyethylene terephthalates (PET), polybutylene terephthalates (PET), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; urea (e.g. melamine-type); phenoxy resins; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof.

With respect to the composition of the support brace 10 described above comprising a rubber/elastomer, examples of suitable rubber/elastomers include neoprene rubbers, buna-N rubbers, silicone rubbers, ethylene propylene diene monomer (EPDM) rubbers, natural gum rubbers, viton rubbers, natural latex rubbers, vinyl rubbers, santoprene rubbers, epichlorohydrin (ECH) rubbers, butyl rubbers, latex-free thermoplastic elastomer (TPEs), thermoplastic elastomers, hypalon rubbers, ethylene propylene rubbers, fluoroelastomer rubbers, fluorosilicone rubbers, hydrogenated nitrile rubbers, nitrile rubbers, perfluoroelastomer rubbers, polyacrylic rubbers, polychloroprenes, polyurethanes, aflas rubbers (e.g. TFE/Ps), chlorosulfonated polyethelene rubbers, styrene butadiene rubbers (SBRs), polyacrylates, ethylene acrylic rubbers, polyvinyl chloride (PVC), ethylene-vinyl acetate (EVA), and combinations thereof.

In various embodiments, the support brace 10 described above may comprise a material (e.g. a resin, rubber, etc.) including a filler. Examples of suitable fillers include reinforcing fillers added for providing mechanical strength, such as inorganic fillers (e.g. fumed silica fine powder, precipitated silica fine powder, fused silica fined powder, baked silica fine powder, fumed titanium dioxide fine powder, quartz fine powder, calcium carbonate fine powder, diatomaceous earth fine powder, aluminum oxide fine powder, aluminum hydroxide powder, zinc oxide fine powder, zinc carbonate fine powder, glass fibers, etc.), organic fibers (e.g. carbon fibers), natural fibers, and the like, as well as combinations thereof.

Figure 6:
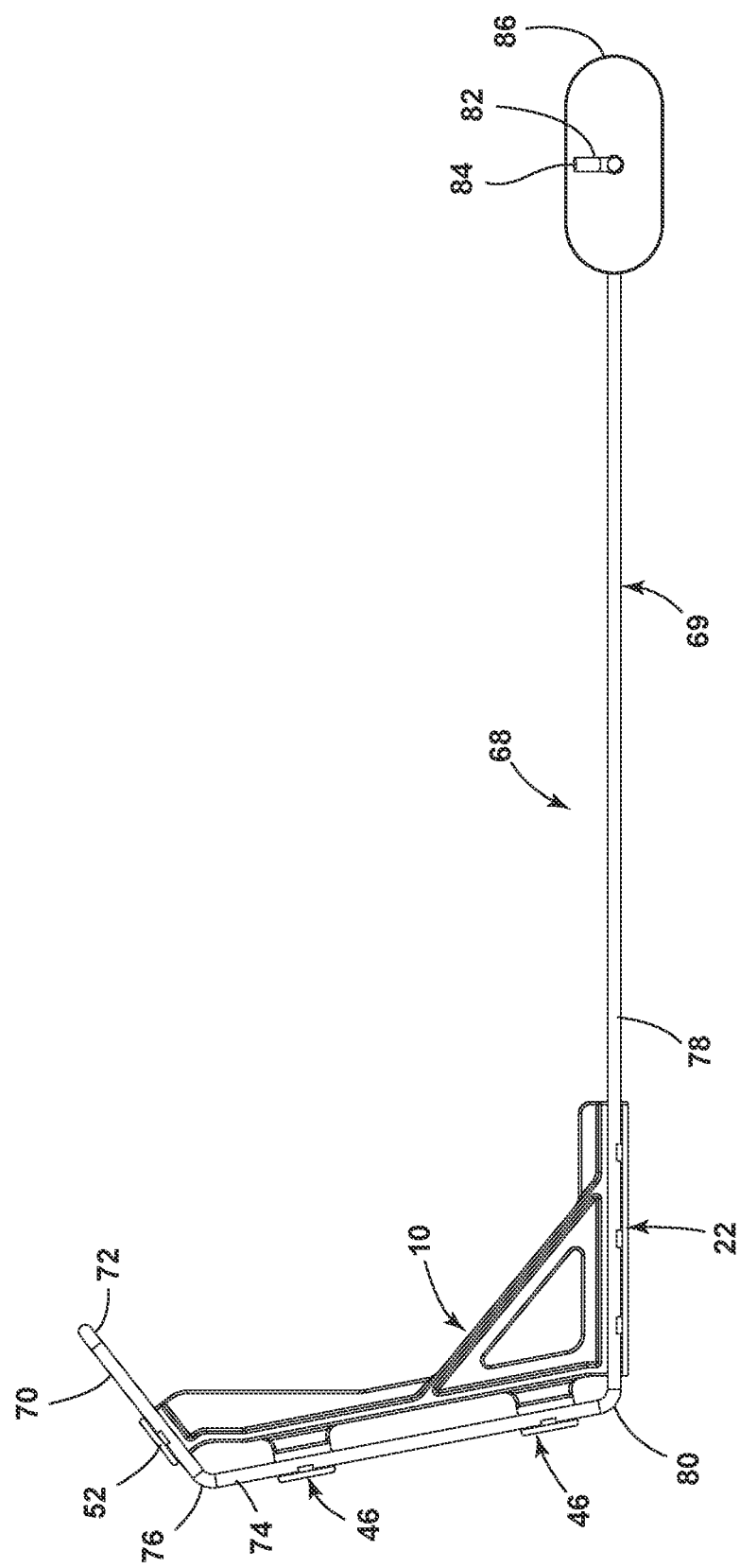
FIG. 6 is a side view of a float arm assembly including the reinforcement support brace in accordance with some embodiments of the disclosure.
Figure 7:
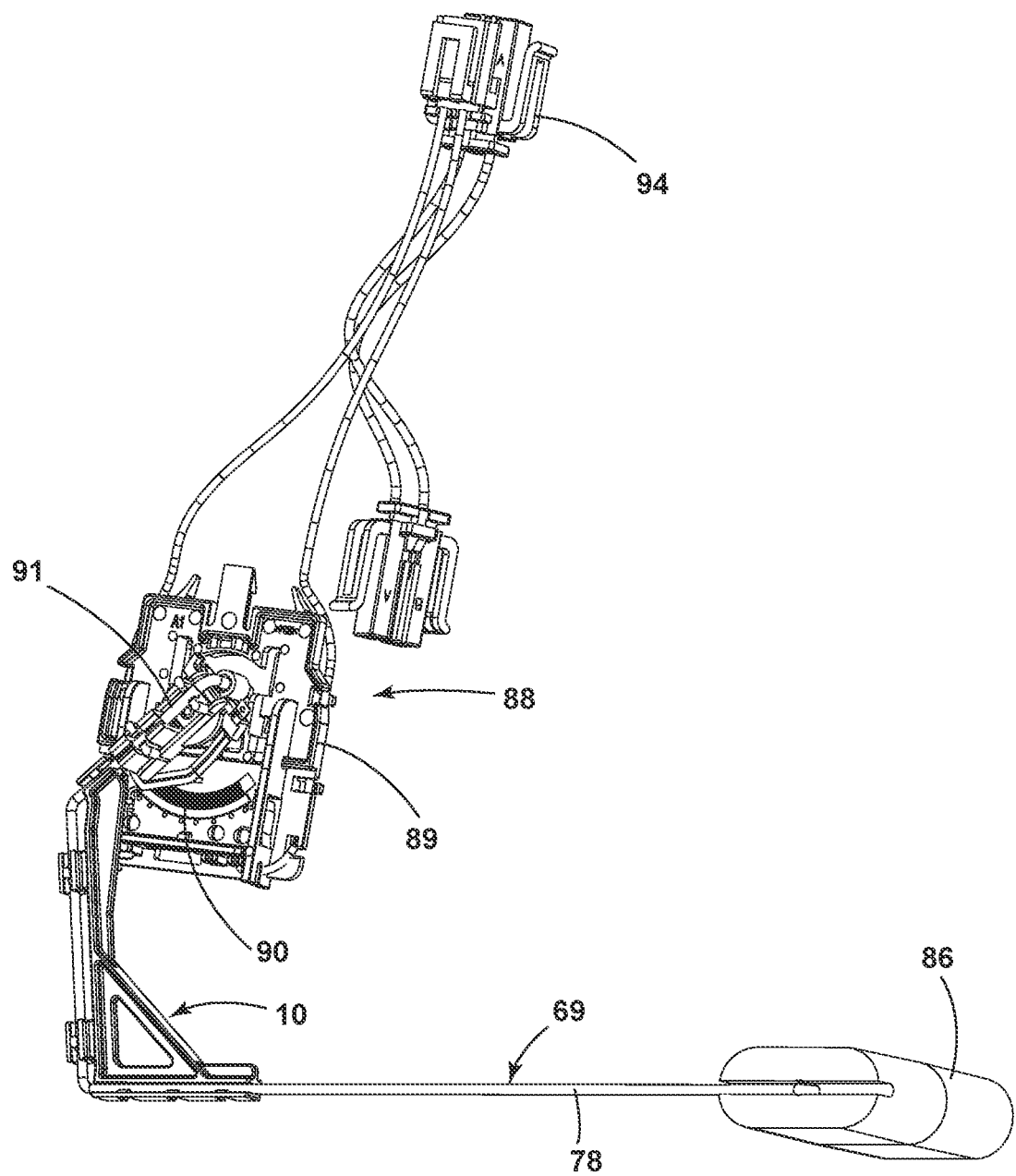
FIG. 7 is a perspective view of a fuel level sensor including the reinforcement support brace in accordance with some embodiments of the disclosure.

Turning to FIG. 6, in use the support brace 10 is mounted on a float arm that together with a float constitute a float arm assembly 68. Particularly, the channel 22, the at least one side clip 46, and the end clip 52 are engageable with a wire/rod 69 that forms the float arm. The support brace 10 reinforces the float arm 68 when the support brace is assembled with the float arm. In some embodiments, the float arm wire 69 is formed of a metal such as stainless steel and is a rod having a plurality of portions that are bent relative to each other such that a bend is disposed between each adjacent portion. Specifically, a first portion 70 at a proximal end 72 of the float arm 68 is connectable to a wiper of a float sensor as shown in FIG. 7 and described in more detail below. An adjacent second portion 74 extends at an angle from the first portion 70, and a first bend 76 is formed between the first and second portions 70, 74. The angle of the first bend 76 may be an obtuse angle. An adjacent third portion 78 extends at an angle from the second portion 74, and a second bend 80 is formed between the second and third portions. The angle of the second bend 80 may also be an obtuse angle. An adjacent fourth portion 82 extends from the third portion 78. The fourth portion 82 forms a terminal, distal end 84 of the float arm 68. The fourth portion 82 may be, for example, generally perpendicular to the third portion 78 in a direction to the side of the third portion, such that the first, second, and third portions 70, 74, 78 of the float arm wire 69 generally lie in the same plane (the third portion 78 may be straight but alternatively may have some bends to avoid other objects during use), and the fourth portion is transverse to the plane. The first, second, third, and fourth portions 70, 74, 78, 82 are integral and continuous portions (in that order) of the wire 69. The fourth portion 82 is connected to a float 86. In some embodiments, the float 86 is fixed to the fourth portion 82 and cannot rotate. In other embodiments, the float 86 is rotatably connected to the fourth portion 82 such that the float can rotate on an axis defined by the fourth portion 82. The float arm wire 69 is snapped into the end clip 52, the side clips 46, and the channel 22 of the support brace 10 to mount the support brace about (on either side of) the first and second bends 76, 80 the float arm wire 69. More particularly, the float arm wire 69 is pushed into the end clip 52, the side clips 46, and the channel 22 such that the wire is pushed against and over the inclined surface 30 of the retainers 28 which cause the clips and channel to flex outwardly to allow the wire to pash the retainers. The float arm wire 69 is held in the clips 52, 46 and channel 22 by the stops 32 of the retainers 28. As mounted, the end clip 52 of the support brace 10 snaps onto the first portion 70 of the float arm wire 69 near the first bend 76, the side clips 46 snap onto the second portion 74 near each of the first and second bends 76, 80, and the channel 22 snaps onto the third portion 78 near the second bend 80. The support brace 10 thereby provides rigidity to the float arm wire 69 and reduces or prevents flexing of the float arm wire at either of the first and second bends 76, 80, and reduces or prevents flexing of the third portion 78 such as when a load is applied at or near the float 86 at the distal end 84 of the wire.

Figure 8:
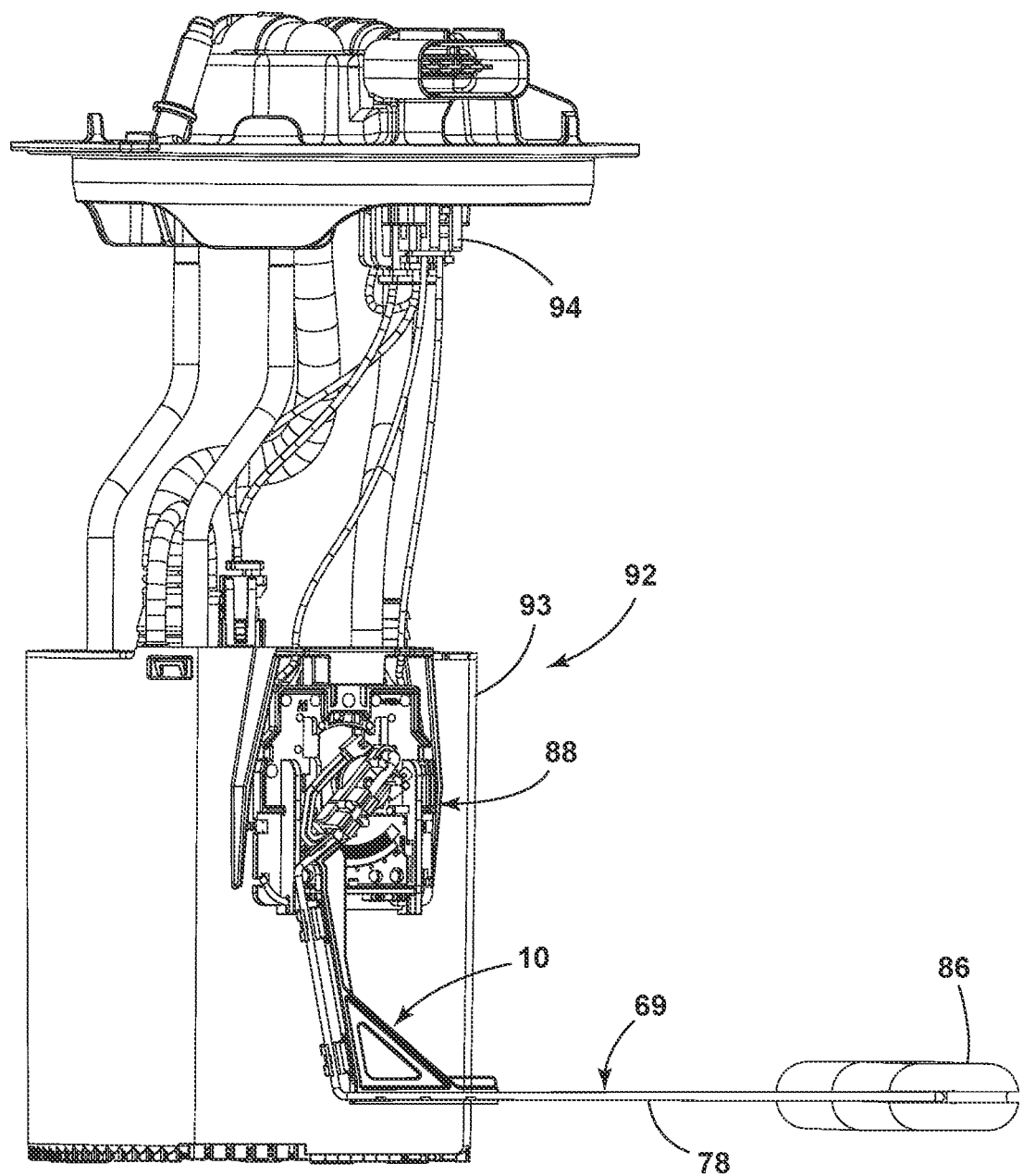
FIG. 8 is a side view of a fuel module of an automotive fuel delivery system including the reinforcement support brace in accordance with some embodiments of the disclosure.

By way of example, in some applications the float arm assembly 68 including the float arm wire 69 and support brace 10 is utilized in a fuel level sensor 88 as shown in FIG. 7. The fuel level sensor 88 includes a body 89 that is typically made of a fuel-resistant material such as but not limited to polyacetal resin. The body 89 houses/mounts the main electrical components of the sensor. In this regard, a resistive device such as a ceramic card 90 (e.g., a ceramic circuit board) is mounted on the body 89, and a wiper arm 91 is pivotally connected to the body in a position to allow an electrode (not shown) of the wiper arm to sweep over the ceramic card. The proximal end 72 of the float arm wire 69 is mounted on the wiper arm 91. Movement of the float arm wire 69 causes the wiper arm 91 to move relative to the ceramic card 90, whereby various angular positions of the wiper arm relative to the ceramic card correspond to various levels of fuel sensed by the sensor 88. For example, as shown in FIG. 8 the fuel level sensor 88 may be used in a fuel pump module 92 that is installed in a fuel tank (not shown) and immersed in liquid (e.g., fuel) that is stored in the fuel sank such as the fuel tank of an internal combustion engine of a vehicle. The fuel module 92 includes a sub-tank 93, and the fuel level sensor 88 is mounted on an outer peripheral wall of the sub-tank so that the fuel level sensor can detect the liquid level of the fuel in the tank. Particularly, the float 86 of the sensor 88 may be made of a lightweight rubber material such as but not limited to foamed ebonite, and has a specific gravity smaller than that of the fuel. The float 86 thereby floats on the top of the fuel in the tank and moves up and down to a position corresponding to the liquid level. As the liquid level in the tank changes (e.g., decreases during consumption of fuel by the engine or increases during filling of the tank), movement of the float 86 on the surface of the fuel (as the level of fuel in the tank changes) causes the float arm wire 69 to rotate the wiper arm 91 relative to the ceramic card 90. The angular position of the wiper 91 relative to the card 90 is sent as a resistive response signal to an ECM via the electrical harness 94. The ECM converts the electrical signal to a visual indication of fuel level output between empty and full that is displayed on a dashboard for a driver.

The bends 76, 80 in the float arm wire 69 may generally correspond to the shape of the fuel tank, including the height of the fuel tank and any features along the floor and other inner surfaces of the fuel tank. The second portion 74 of the wire 69 is bent relative to the first portion 70 to allow the float arm 68 to extend from the wiper arm 91 towards the floor of the tank. In some orientations, the second portion 74 may be perpendicular to the tank floor or parallel to a center line of the sub-tank 93. The third portion 78 of the wire 69 is bent relative to the second portion 74 so that the third portion can extend along the floor of the tank. In a resting configuration (e.g., in which the tank is empty or near empty), the third portion 78 may be parallel to the tank floor. The third portion 78 also may include other bend(s) along its length to avoid contact with surface features of the tank. The angle $\alpha$ between the base 12 and beam 36 of the support brace 10 corresponds to the angle between the second and third portions 74, 78 of the float arm wire 69.

The float arm wire 69 is susceptible to deformation due to spring back, packaging, handling, manipulation, the assembly process (e.g. into a fuel level sensor and fuel level sensor into a fuel module), and drop down (e.g., bending of the third portion 78 of the wire) due to loads exerted by and on the float 86 and the load of the wire itself which can increase as a function of the length of the third portion. The deformation may occur along the length of the float arm wire 69 as well as at the bends 76, 80 in the wire. The deformation of the third portion 78, which changes the position of the float 86 relative to the rest of the float arm assembly (float arm 68, support brace 10) and the wiper arm 91 of the fuel level sensor 88 leads to errors in the fuel level measurement due to the difference between the actual height of the float 86 versus the calibrated height as a function of the resistance between the wiper arm 91 and ceramic card 90. The support brace 10, by reinforcing the float arm wire 69 and reducing the likelihood of bending deformation of the wire, reduces variation in the float position at the distal end 84 of the float arm 68 during use in comparison to the calibrated position of the float arm. Even if the third portion 78 of the float arm wire 69 encounters some deformation with the support brace 10 in use, the support brace strengthens the wire and thus more precisely controls the position of the distal end of the wire (by assuring that the float is repeatedly in the same position as a function of the angular position of the wiper arm 91 relative to the ceramic card 90), providing greater control over the end position of the float and leading to a more repetitive outcome of the height versus electrical resistance measurement.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A support brace for a float arm of a fluid level sensor, the support brace comprising:
a base having opposite first and second ends;
a beam having opposite first and second ends, the first end of the beam being connected to the first end of the base, and the beam extending from the base wherein an angle is formed between the base and the beam;
a diagonal member extending between the base and the beam, the diagonal member being connected to the base between the first and second ends of the base, and the diagonal member being connected to the beam between the first and second ends of the beam;
a channel formed along a length of the base;
at least one side clip attached to a side of the beam, wherein the second end of the beam to which the end clip is attached forms an obtuse angle with the side of the beam; and
an end clip attached to the second end of the beam, wherein the end clip attached to the second end of the beam is tilted relative to the adjacent side clip attached to the side of the beam;
wherein the channel, the at least one side clip, and the end clip are engageable with a wire that forms the float arm, and the support brace reinforces the float arm.

2. The support brace of claim 1, wherein a triangular opening is formed between the base, the beam, and the diagonal member.

3. The support brace of claim 1, wherein the angle is an obtuse angle.

4. The support brace of claim 1, wherein the channel has a U-shaped cross-sectional shape.

5. The support brace of claim 1, wherein each of the at least one side clip is connected to the beam by a linear projection that spaces each clip from the beam.

6. The support brace of claim 1, wherein each of the base, the beam, and the diagonal member includes a flange and a stem that together have a T-shaped cross-sectional shape.

7. The support brace of claim 1, wherein the support brace is of a one-piece, monolithic construction.

8. The support brace of claim 1, wherein the channel includes a plurality of retainers.

9. The support brace of claim 8, wherein the retainers are spaced from each other along a length of the channel.

10. The support brace of claim 1, wherein the end clip includes a channel having a U-shaped cross-sectional shape.

11. The support brace of claim 10, wherein the end clip includes a retainer centrally disposed along a length of the channel.

12. The support brace of claim 1, wherein each of the at least one side clip includes a channel having a U-shaped cross-sectional shape.

13. The support brace of claim 12, wherein each of the at least one side clip includes a retainer centrally disposed along a length of the channel.

14. The support brace of claim 12, wherein the channel of each of the at least one side clip is parallel to the beam.

15. A fuel level sensor for a fuel module, the fuel level sensor comprising:
a body;
a ceramic card mounted on the body;
a wiper arm pivotally connected to the body, the wiper arm being rotatable relative to the ceramic card;
a float arm having a proximal end and a distal end, the proximal end being mounted on the wiper arm;
a float connected to the distal end of the float arm; and
the support brace of claim 1;
wherein the support brace is mounted on the float arm via the end clip, the side clips, and the channel.

16. A fuel module including the fuel level sensor of claim 15.

17. A float arm assembly for a float of a fuel level sensor, the float arm assembly comprising:
- a float arm wire having a plurality of portions wherein adjacent portions are bent relative to each other such that a bend is disposed between each adjacent portion; and
- the support brace of claim 1;
- wherein the float arm wire is snapped into the end clip, the side clips, and the channel of the support brace to mount the support brace about certain of the bends in the float arm wire.

18. The float arm assembly of claim 17, including a float connected to a distal end of the float arm wire.

19. The float arm assembly of claim 18, wherein the float is one of: (i) fixedly connected to the float arm; and (ii) rotatably connected to the float arm.

\* \* \* \* \*